(12) United States Patent
Tanabe

(10) Patent No.: US 8,104,942 B2
(45) Date of Patent: Jan. 31, 2012

(54) LIGHT GUIDE SHEET AND MOVABLE CONTACT ELEMENT USING THE SAME

(75) Inventor: Koji Tanabe, Osaka (JP)

(73) Assignee: Panasonic Corporation, Osaka (JP)

( * ) Notice: Subject to any disclaimer, the term of this patent is extended or adjusted under 35 U.S.C. 154(b) by 414 days.

(21) Appl. No.: 12/433,141

(22) Filed: Apr. 30, 2009

(65) Prior Publication Data

US 2009/0323357 A1  Dec. 31, 2009

(30) Foreign Application Priority Data

Jun. 27, 2008  (JP) ................................. 2008-168353

(51) Int. Cl.
*F21V 33/00* (2006.01)

(52) U.S. Cl. ............ 362/551; 362/27; 362/29; 200/310; 200/317; 379/368; 359/296

(58) Field of Classification Search .......... 362/551–582, 362/23–30; 200/310–317, 60; 379/368; 359/296, 224.1

See application file for complete search history.

(56) References Cited

U.S. PATENT DOCUMENTS

| 7,177,067 | B1 | 2/2007 | Sakamoto | |
|---|---|---|---|---|
| 2007/0024954 | A1* | 2/2007 | Sakamoto | 359/296 |
| 2007/0159681 | A1* | 7/2007 | Yamamoto | 359/296 |
| 2007/0177248 | A1* | 8/2007 | Kanbayashi | 359/296 |

FOREIGN PATENT DOCUMENTS

| CN | 1908794 A | 2/2007 |
|---|---|---|
| JP | 2007-087749 A | 4/2007 |

OTHER PUBLICATIONS

Chinese Office Action dated Feb. 25, 2011.

* cited by examiner

*Primary Examiner* — Laura Tso

(74) *Attorney, Agent, or Firm* — Pearne & Gordon LLP

(57) ABSTRACT

A light guide sheet and a movable contact element using the sheet are inexpensive and provide adequate illumination. In the light guide sheet, light-transmissive upper conductive layers, reflective layers, and lower conductive layers are laminated in this order in predetermined positions on the bottom surface of a light-transmissive, film-like cover sheet. The reflective layers have reverse particles dispersed therein, whose top and bottom surfaces are reversed between light color and dark color.

1 Claim, 3 Drawing Sheets

LIGHT GUIDE SHEET AND MOVABLE CONTACT ELEMENT USING THE SAME

BACKGROUND OF THE INVENTION

1. Field of the Invention

The present invention relates to a light guide sheet and a movable contact element using the sheet, which are used to operate various electronic apparatuses.

2. Background Art

In recent years, an increasing number of electronic apparatuses such as portable telephones and other portable terminals have come to use light emitting diodes or EL (electroluminescent) devices as light sources to illuminate their operating parts. The illumination allows the user to easily distinguish between push buttons or to operate the display in dark environments. In line with this trend, light guide sheets, movable contact elements, and switches which are used in these apparatuses are also expected to be less expensive and capable of being illuminated in such a manner as to provide the user with better visibility.

FIG. 7 is a sectional view of a conventional switch. In FIG. 7, the dimensions of some parts are exaggerated for clarity.

The switch includes movable contact element 3 having film-like base sheet 1 and dome-shaped movable contacts 2 pasted on its bottom surface via an adhesive (not shown). Movable contacts 2 are formed of a conductive sheet metal. The switch also includes wiring board 4, which is provided on its upper and lower surfaces with wiring patterns (not shown). Wiring board 4 is also provided on its upper surface with fixed contacts 5 each consisting of circular central fixed contact 5A and horseshoe- or ring-shaped outer fixed contact 5B surrounding central fixed contact 5A.

Movable contact element 3 is pasted on the upper surface of wiring board 4 in such a manner that the outer peripheries of movable contacts 2 are placed on outer fixed contact 5B and that the centers of the bottom surfaces of movable contacts 2 are opposed to central fixed contacts 5A with a predetermined spacing therebetween. The switch also includes light-emitting devices 6 composed, for example, of light emitting diodes, which are arranged between movable contacts 2 on the upper surface of wiring board 4 with their light emitting surfaces facing upward.

The switch also includes light-transmissive, film-like display sheet 7, which is provided on its bottom surface with light shielding part 7A and display parts 7B. Light shielding part 7A is formed by printing or other means, and display parts 7B are formed by hollowing predetermined positions of light shielding part 7A out in the shape of characters, symbols, and other graphic elements. Display parts 7B are arranged over movable contacts 2.

The conventional switch thus structured is installed on the control surface of an electronic apparatus, with central fixed contacts 5A, outer fixed contacts 5B, and light-emitting devices 6 connected to electronic circuits (not shown) of the apparatus via the wiring patterns, lead wires (not shown), and the like.

When the user presses one of display parts 7B of display sheet 7, display sheet 7 is bent to press the dome-shaped center of movable contact 2 that corresponds to the pressed display part 7B. When a predetermined compressive force is applied, movable contact 2 is elastically inverted downward with a click feel. As a result, movable contact 2 comes into contact at the center of its bottom surface with central fixed contact 5A, thereby electrically connecting central fixed contact 5A and outer fixed contact 5B. This allows an electronic circuit of the apparatus to detect which one of display parts 7B has been pressed.

When the user releases the compressive force applied to display sheet 7, movable contact 2 is elastically inverted upward by the elastic returning force. As a result, the center of the bottom surface of movable contact 2 is separated from central fixed contact 5A, thereby electrically disconnecting central fixed contact 5A and outer fixed contact 5B.

The electrical connection and disconnection switches the functions of the apparatus. When power is supplied from an electronic circuit of the apparatus, light-emitting devices 6 emit light, which illuminates display parts 7B of display sheet 7 from below. This allows the user to easily distinguish between the characters, symbols, and other graphic elements on display parts 7B in dark environments.

As described above, in the conventional switch, fixed contacts 5A and 5B are electrically connected and disconnected by pressing and releasing movable contacts 2 via display sheet 7, and display parts 7B of display sheet 7 are illuminated by the light emitted by light-emitting devices 6. A conventional technique related to the present invention is disclosed in Japanese Patent Unexamined Publication No. 2007-87749.

In movable contact element 3 and the switch of the above-described conventional example, light-emitting devices 6 are arranged between movable contacts 2 and illuminate display parts 7B of display sheet 7. This structure requires a large number of light-emitting devices 6, thus taking time for production and being expensive.

SUMMARY OF THE INVENTION

An object of the present invention is to provide a light guide sheet and a movable contact element using the sheet which are inexpensive and provide adequate illumination.

In the light guide sheet according to the present invention, light-transmissive upper conductive layers, reflective layers, and lower conductive layers are laminated in this order in predetermined positions on the bottom surface of the light-transmissive, film-like cover sheet. The reflective layers have reverse particles dispersed therein, whose top and bottom surfaces are reversed between light color and dark color. The top and bottom surfaces of the reverse particles in the reflective layers are reversed between light color and dark color according to the polarities of the voltages applied to the upper and lower conductive layers. The light of the light-emitting devices incident from one end of the cover sheet is reflected by the reflective layers and illuminates the display parts. This achieves uniform illumination using only one or a couple of light-emitting devices, thus allowing the light guide sheet to be inexpensive and to provide adequate illumination.

The movable contact element according to the present invention includes the light guide sheet according to the present invention, and dome-shaped movable contacts arranged under the reflective layers of the light guide sheet, the movable contacts being formed of a conductive sheet metal. This allows the movable contact element to be inexpensive and to provide adequate illumination.

Thus, the present invention provides a light guide sheet and a movable contact element using the sheet which are inexpensive and provide adequate illumination.

DETAILED DESCRIPTION OF THE INVENTION

Figure 1:
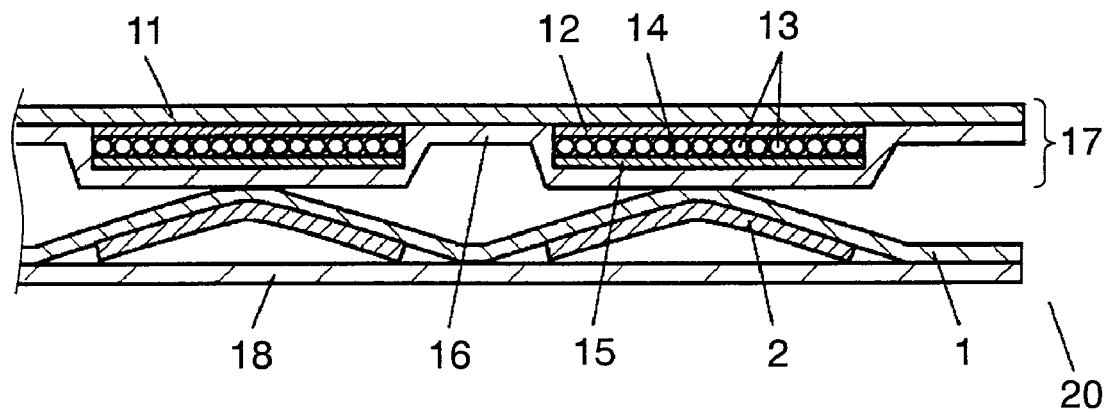
FIG. 1 is a sectional view of a movable contact element according to an embodiment of the present invention.

An embodiment of the present invention will be described as follows with reference to FIGS. 1 to 6. In these drawings, the dimensions of some parts are exaggerated for clarity. Like components are labeled with like reference numerals with respect to the switch described in the section of Background Art, and hence the detailed description thereof will be omitted.

Embodiment

Figure 2:
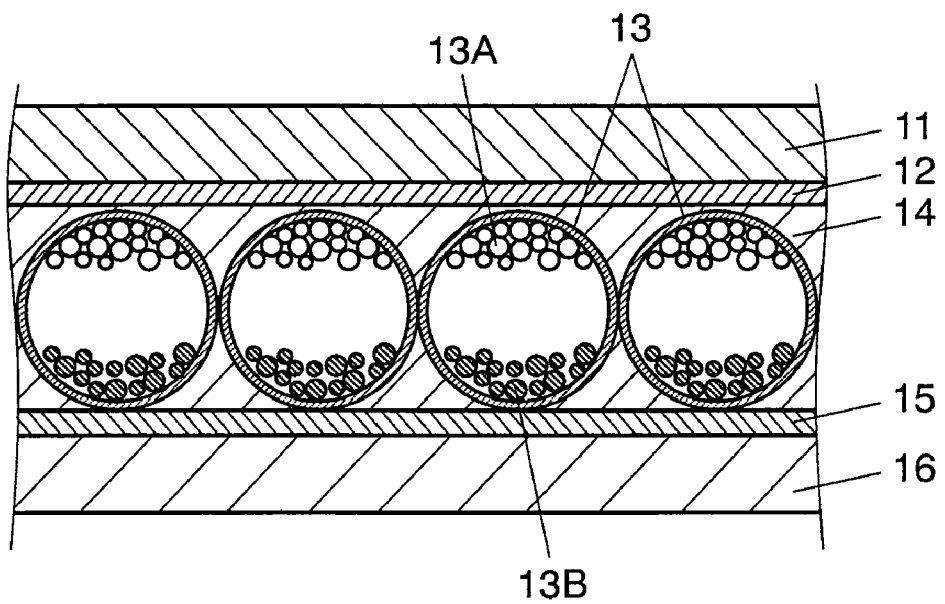
FIG. 2 is a partial sectional view of a light guide sheet according to the embodiment of the present invention.

FIG. 1 is a sectional view of movable contact element 20 according to an embodiment of the present invention. FIG. 2 is a partial sectional view of light guide sheet 17 according to the embodiment. As shown in FIGS. 1 and 2, movable contact element 20 includes light guide sheet 17 having flexible, light-transmissive, film-like cover sheet 11 and light-transmissive upper conductive layers 12 formed in predetermined positions on the bottom surface of cover sheet 11 by sputtering, printing, or other means. Cover sheet 11 is made of such as polyethylene terephthalate, polycarbonate, polyurethane, or silicone. Upper conductive layers 12 can be either conductive thin films made of such as indium tin oxide, tin oxide, or zinc oxide, or conductive polymer thin films made of such as polyacetylene, polyaniline, polypyrrole, polythienylene, or polythiophene.

Light guide sheet 17 also includes reflective layers 14 formed by printing or other means on the bottom surfaces of upper conductive layers 12. Reflective layers 14 are formed of light-transmissive insulating resin such as polyester, silicone, or epoxy, and reverse particles 13. More specifically, the resin contains xylene, n-dodecane, paraffin, terpenes, or other material in the form of a solution or a gas, and capsular reverse particles 13 dispersed in the solution or the gas. Reverse particles 13 have positively-charged light color powder 13A such as a titanium oxide and negatively-charged dark color powder 13B such as carbon sealed therein. The light color is for example white, and the dark color is for example black.

Light guide sheet 17 also includes lower conductive layers 15 arranged on the bottom surfaces of reflective layers 14. Lower conductive layers 15 are made of such as polyester or epoxy, both of which are dispersed, for example, with silver or carbon. Cover sheet 11 and these layers 12, 14, and 15 are coated with insulating layer 16, which is a film of, for example, polyethylene terephthalate or polycarbonate, or made of such as polyester or epoxy.

Movable contact element 20 also includes flexible film-like base sheet 1 whose outer periphery is pasted at predetermined positions on the bottom surface of light guide sheet 17 via an adhesive (not shown). Base sheet 1 is made of such as polyethylene terephthalate or polycarbonate. Movable contact element 20 also includes dome-shaped movable contacts 2, which are pasted on the bottom surface of base sheet 1 under reflective layers 14. Movable contacts 2 are formed of a conductive sheet metal such as a copper alloy or steel.

Movable contact element 20 also includes film-like separator 18, which is made for example of polyethylene terephthalate. Separator 18 is pasted over the entire bottom surface of base sheet 1 so as to protect the bottom surfaces of movable contacts 2 from dust and dirt during storage or transportation.

Figure 3:
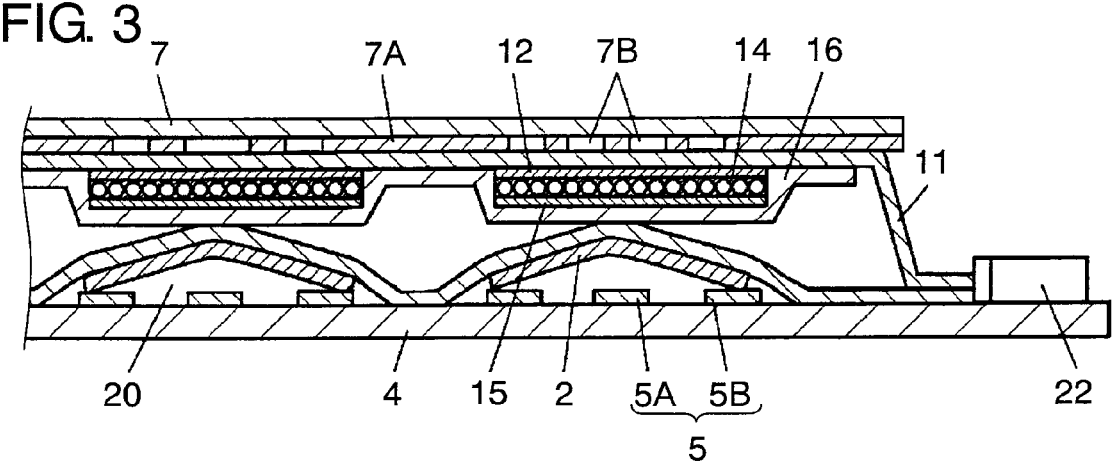
FIG. 3 is a sectional view of a switch using the movable contact element according to the embodiment of the present invention.

FIG. 3 is a sectional view of a switch using movable contact element 20 according to the embodiment. In FIG. 3, the switch includes wiring board 4, which can be a film made of such as polyethylene terephthalate or polycarbonate, or a plate made of such as paper phenol or glass-filled epoxy. Wiring board 4 is provided on its upper and lower surfaces with wiring patterns (not shown) made for example of copper. Wiring board 4 is also provided on its upper surface with fixed contacts 5 made of such as copper or carbon. Fixed contacts 5 each consist of circular central fixed contact 5A and horse-shoe- or ring-shaped outer fixed contact 5B surrounding central fixed contact 5A.

Movable contact element 20 from which separator 18 has been removed is pasted on the upper surface of wiring board 4 in such a manner that the outer peripheries of movable contacts 2 are placed on outer fixed contacts 5B, and that the centers of the bottom surfaces of movable contacts 2 are opposed to central fixed contact 5A with a predetermined spacing therebetween. As a result, under reflective layers 14 of light guide sheet 17, there are formed switch contacts.

The switch also includes light-emitting devices 22 composed, for example, of light emitting diodes, which are placed right light guide sheet 17 on the upper surface of wiring board 4. Light-emitting devices 22 are arranged with their light emitting surfaces facing the right end of cover sheet 11 that is bent downward from light guide sheet 17.

The switch also includes light-transmissive, film-like display sheet 7, which is provided on its bottom surface with light shielding part 7A and display parts 7B.

Light shielding part 7A is formed by printing or other means, and display parts 7B are formed by hollowing predetermined positions of light shielding part 7A out in the shape of characters, symbols, and other graphic elements. Display parts 7B are arranged over reflective layers 14 of light guide sheet 17 and movable contacts 2.

The switch thus structured is installed on the control surface of an electronic apparatus, with upper conductive layers 12 and lower conductive layers 15 of light guide sheet 17, fixed contacts 5, and light-emitting devices 22 connected to electronic circuits (not shown) of the apparatus via the wiring patterns, lead wires (not shown), and the like.

When the user presses one of display parts 7B of display sheet 7, display sheet 7 and light guide sheet 17 are bent to press the dome-shaped center of movable contact 2 that corresponds to the pressed display part 7B. When a predetermined compressive force is applied, movable contact 2 is elastically inverted downward with a click feel. As a result, movable contact 2 comes into contact at the center of its bottom surface with central fixed contact 5A, thereby electrically connecting central fixed contact 5A and outer fixed contact 5B. This allows an electronic circuit of the apparatus to detect which one of display parts 7B has been pressed.

When the user releases the compressive force applied to display sheet 7, movable contact 2 is elastically inverted upward by the elastic returning force. As a result, the center of the bottom surface of movable contact 2 is separated from central fixed contact 5A, thereby electrically disconnecting central fixed contact 5A and outer fixed contact 5B.

The electrical connection and disconnection switches the functions of the apparatus. When power is supplied from an electronic circuit of the apparatus, light-emitting devices 22 emit light, which is incident on light guide sheet 17 from the right end of cover sheet 11 and travels leftward while being reflected in cover sheet 11.

Power from the electronic circuit is also supplied to upper and lower conductive layers 12 and 15 of light guide sheet 17. In the case where upper conductive layers 12 are supplied with a negative voltage, and lower conductive layers 15 are supplied with a positive voltage, as shown in FIG. 2, positively-charged light color powder 13A migrates toward upper conductive layers 12, and negatively-charged dark color powder 13B migrates toward lower conductive layers 15 in the capsular reverse particles 13 dispersed in reflective layers 14.

As a result, light color powder 13A such as titanium oxide travels and gathers on the upper side of reverse particles 13 in reflective layers 14, making the top surfaces of reflective layers 14 have light color. On the other hand, dark color powder 13B such as carbon travels and gathers on the lower side of reverse particles 13, making the bottom surfaces of reflective layers 14 have dark color.

The light incident on cover sheet 11 is diffused and reflected by the top surfaces of the light-color reflective layers 14 under cover sheet 11 and then illuminates display parts 7B of display sheet 7 from below. This allows the user to easily distinguish between the characters, symbols, and other graphic elements on display parts 7B in dark environments.

Figure 4:
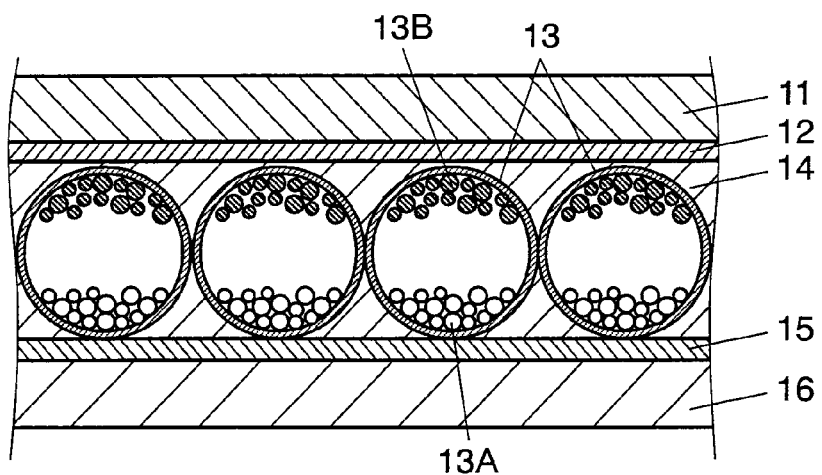
FIG. 4 is another partial sectional view of the light guide sheet according to the embodiment of the present invention.

FIG. 4 is another partial sectional view of light guide sheet 17 according to the embodiment. In FIG. 4, opposite to the case of FIG. 2, the electronic circuit supplies a positive voltage to upper conductive layers 12 and a negative voltage to lower conductive layers 15. In this case, positively-charged light color powder 13A migrates toward lower conductive layers 15, and negatively-charged dark color powder 13B migrates toward upper conductive layers 12. As a result, the top surfaces of reflective layers 14 have dark color and the bottom surfaces thereof have light color. The light incident on cover sheet 11 is absorbed in the top surfaces of reflective layers 14 and does not illuminate display parts 7B thereabove.

In the switch using movable contact element 20 according to the present invention, fixed contacts 5A and 5B are electrically connected and disconnected by pressing and releasing movable contacts 2 via display sheet 7. The light of light-emitting devices 22 is introduced into light guide sheet 17 from its right end. Upper and lower conductive layers 12 and 15 are supplied with voltages so as to reverse the top and bottom surfaces of reverse particles 13 in reflective layers 14 between light color and dark color. The light is reflected by the top surfaces of reflective layers 14 and illuminates display parts 7B of display sheet 7.

In light guide sheet 17 according to the present invention, light-transmissive upper conductive layers 12, reflective layers 14 dispersed with reverse particles 13 whose top and bottom surfaces can be reversed between light color and dark color, and lower conductive layers 15 are laminated in this order on the bottom surface of cover sheet 11. The light of light-emitting devices 22 incident on light guide sheet 17 is reflected by the top surfaces of reflective layers 14 and illuminates display parts 7B, thus achieving uniform illumination using only one or a couple of light-emitting devices 22.

Changing the polarities of the voltages supplied to upper and lower conductive layers 12 and 15 can reverse the direction in which light and dark color powders 13A and 13B sealed in reverse particles 13 migrate, thereby changing the top surfaces of reflective layers 14 to light color or dark color. This makes it possible to provide various illumination patterns such as illuminating or flashing only a desired position of display parts 7B.

Figure 5:
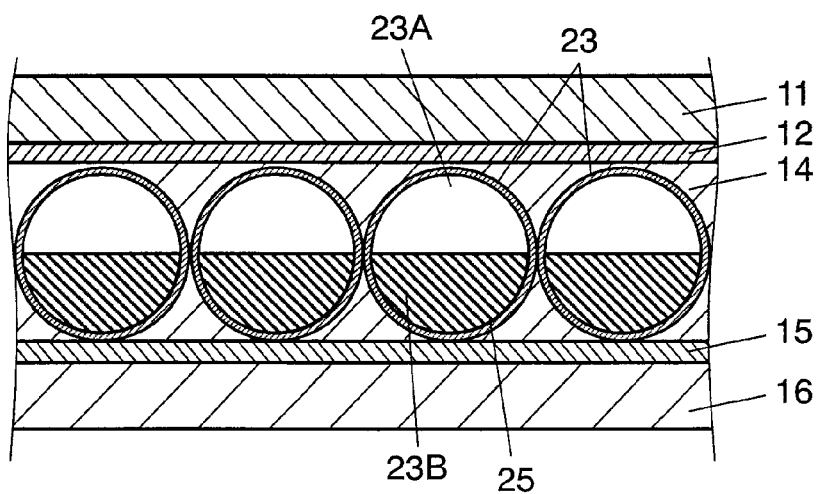
FIG. 5 is a partial sectional view of another light guide sheet according to the embodiment of the present invention.

FIG. 5 is a partial sectional view of another light guide sheet according to the embodiment. In the above description, reflective layers 14 include light-transmissive insulating resin in which reverse particles 13 having positively-charged light color powder 13A and negatively-charged dark color powder 13B sealed therein are dispersed in a solution or a gas. Alternatively, however, the present invention can be implemented by the example shown in the partial sectional view of FIG. 5. In FIG. 5, in reflective layers 14, the light-transmissive insulating resin has spherical reverse particles 23 dispersed therein. Reverse particles 23 include positively-charged light color parts 23A in their upper half and negatively-charged dark color parts 23B in their lower half. Reverse particles 23 also include gaps 25 at the outer peripheries, which may be filled with a solution.

Figure 6:
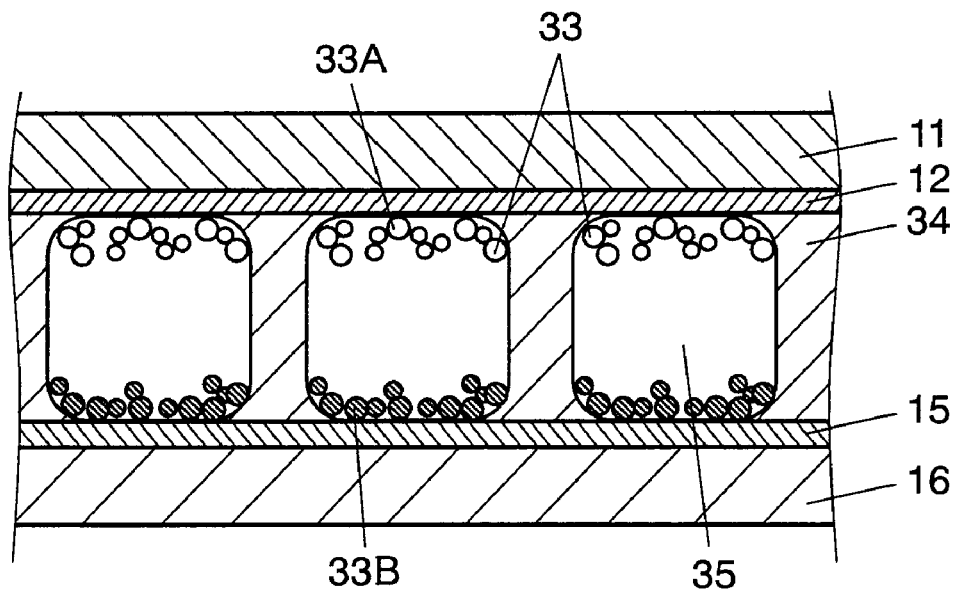
FIG. 6 is a partial sectional view of further another light guide sheet according to the embodiment of the present invention.
Figure 7:
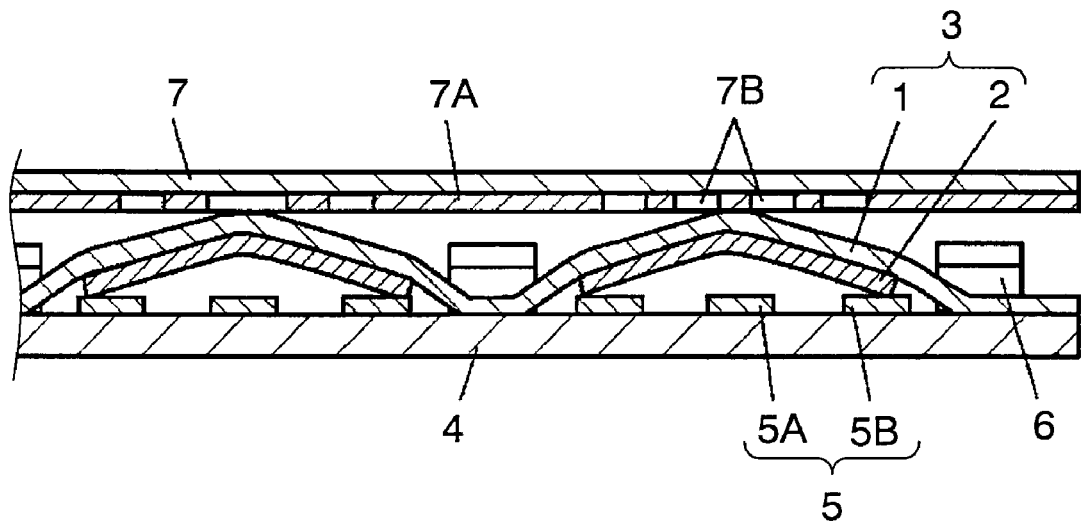
FIG. 7 is a sectional view of a conventional switch.

FIG. 6 is a partial sectional view of further another light guide sheet according to the present invention. As shown in FIG. 6, reflective layers 14 can be replaced by reflective layers 34 formed as follows. First, microcups 35 having circular or square openings are formed from light-transmissive insulating resin on lower electrode 15. Next, positively-charged light color powder 33A and negatively-charged dark color powder 33B are sealed into microcups 35. Then, the top surfaces of reflective layers 34 are sealed by upper conductive layers 12 of cover sheet 11.

In the above description, upper conductive layers 12, reflective layers 14, and lower conductive layers 15 are laminated in this order on the bottom surface of cover sheet 11 by sputtering, printing, or other means. Alternatively, however, only upper conductive layers 12 may be formed on the bottom surface of cover sheet 11 by sputtering, printing, or other means. In this case, a film-like sheet including reflective layers 14 may be pasted on the bottom surface of upper conductive layers 12, and then lower conductive layers 15 may be pasted on the bottom surface of reflective layers 14.

As described above, in light guide sheet 17 according to the present invention, light-transmissive upper conductive layers 12, reflective layers 14, and lower conductive layers 15 are laminated in this order in the predetermined positions on the bottom surface of light-transmissive film-like cover sheet 11, and reflective layers 14 have reverse particles 13 dispersed therein, whose top and bottom surfaces can be reversed between light color and dark color. The top and bottom surfaces of reverse particles 13 in reflective layers 14 are reversed between light color and dark color according to the polarities of the voltages applied to upper and lower conductive layers 12 and 15. The light of light-emitting devices 22 incident from one end of cover sheet 11 is reflected by reflective layers 14 and illuminates display parts 7B, thus achieving uniform illumination using only one or a couple of light-emitting devices. As a result, guide sheet 17 is inexpensive and provides adequate illumination.

In movable contact element 20 described above, movable contacts 2 are pasted on the bottom surface of base sheet 1, which is then pasted on the bottom surface of light guide sheet 17. Alternatively, movable contacts 2 may be directly pasted on the bottom surface of light guide sheet 17 so as to provide a less expensive movable contact element.

As described hereinbefore, the light guide sheet and the movable contact element using the sheet according to the present invention, which are inexpensive and provide adequate illumination, are useful for the operation of various electronic apparatuses.

What is claimed is:

1. A movable contact element comprising:
a light guide sheet comprising:
- a light-transmissive, film-like cover sheet;
- light-transmissive upper conductive layers;
- reflective layers having reverse particles dispersed therein, top and bottom surfaces of the reverse particles being reversed between light color and dark color;
- lower conductive layers; and dome-shaped movable contacts arranged under the reflective layers of the light guide sheet, the movable contacts being formed of a conductive sheet metal,
wherein the upper conductive layers, the reflective layers, and the lower conductive layers being laminated in this order in predetermined positions on a bottom surface of the cover sheet.

* * * * *